United States Patent
Pelissier et al.

(10) Patent No.: US 7,433,351 B1
(45) Date of Patent: Oct. 7, 2008

(54) ISOLATION OF DATA, CONTROL, AND MANAGEMENT TRAFFIC IN A STORAGE AREA NETWORK

(75) Inventors: Joseph E. Pelissier, Hillsboro, OR (US); Vikas Deolaliker, Lexington, SC (US); Joseph I. Chamdani, Santa Clara, CA (US); Litko Chan, San Jose, CA (US); Gurumurthy D. Ramkumar, South San Francisco, CA (US); Rajasekhar Cherabuddi, Cupertino, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 870 days.

(21) Appl. No.: 10/153,512

(22) Filed: May 22, 2002

(51) Int. Cl.
*H04L 12/28* (2006.01)
*H04L 12/56* (2006.01)
*H04J 3/24* (2006.01)
*G06F 15/16* (2006.01)

(52) U.S. Cl. .................. 370/389; 370/401; 370/475; 709/249

(58) Field of Classification Search ......... 370/230–359, 370/381–389, 392–475; 709/241–249
See application file for complete search history.

(56) References Cited

U.S. PATENT DOCUMENTS

| | | | | |
|---|---|---|---|---|
| 5,617,421 A * | 4/1997 | Chin et al. | ............... | 370/402 |
| 5,666,359 A * | 9/1997 | Bennett et al. | ............. | 370/358 |
| 5,872,781 A * | 2/1999 | Bennett et al. | ............. | 370/365 |
| 6,189,044 B1 * | 2/2001 | Thomson et al. | ............ | 709/242 |
| 6,484,213 B1 * | 11/2002 | Nouri | ..................... | 709/249 |
| 6,885,664 B2 * | 4/2005 | Ofek et al. | .................. | 370/372 |
| 6,915,370 B2 * | 7/2005 | Rankin et al. | ................ | 710/305 |
| 6,920,554 B2 * | 7/2005 | Rawson, III | ................ | 713/100 |
| 7,020,146 B2 * | 3/2006 | Smith et al. | ................. | 370/401 |
| 7,035,286 B2 * | 4/2006 | Tzeng | ....................... | 370/475 |
| 7,095,716 B1 * | 8/2006 | Ke et al. | .................... | 370/230 |
| 2003/0026274 A1 * | 2/2003 | Droz | ......................... | 370/410 |
| 2003/0169731 A1 * | 9/2003 | Wickeraad | .................. | 370/359 |

* cited by examiner

*Primary Examiner*—M. Phan
(74) *Attorney, Agent, or Firm*—Hensley Kim & Holzer, LLC

(57) ABSTRACT

Switching data packets includes forwarding first data packets to a first port that is associated with a first domain. Second data packets are forwarded to a second port that is associated with a second domain. The first data packets are managed using a first management subsystem of a service processor card, and the second data packets are managed using a second management subsystem of the service processor card.

28 Claims, 5 Drawing Sheets

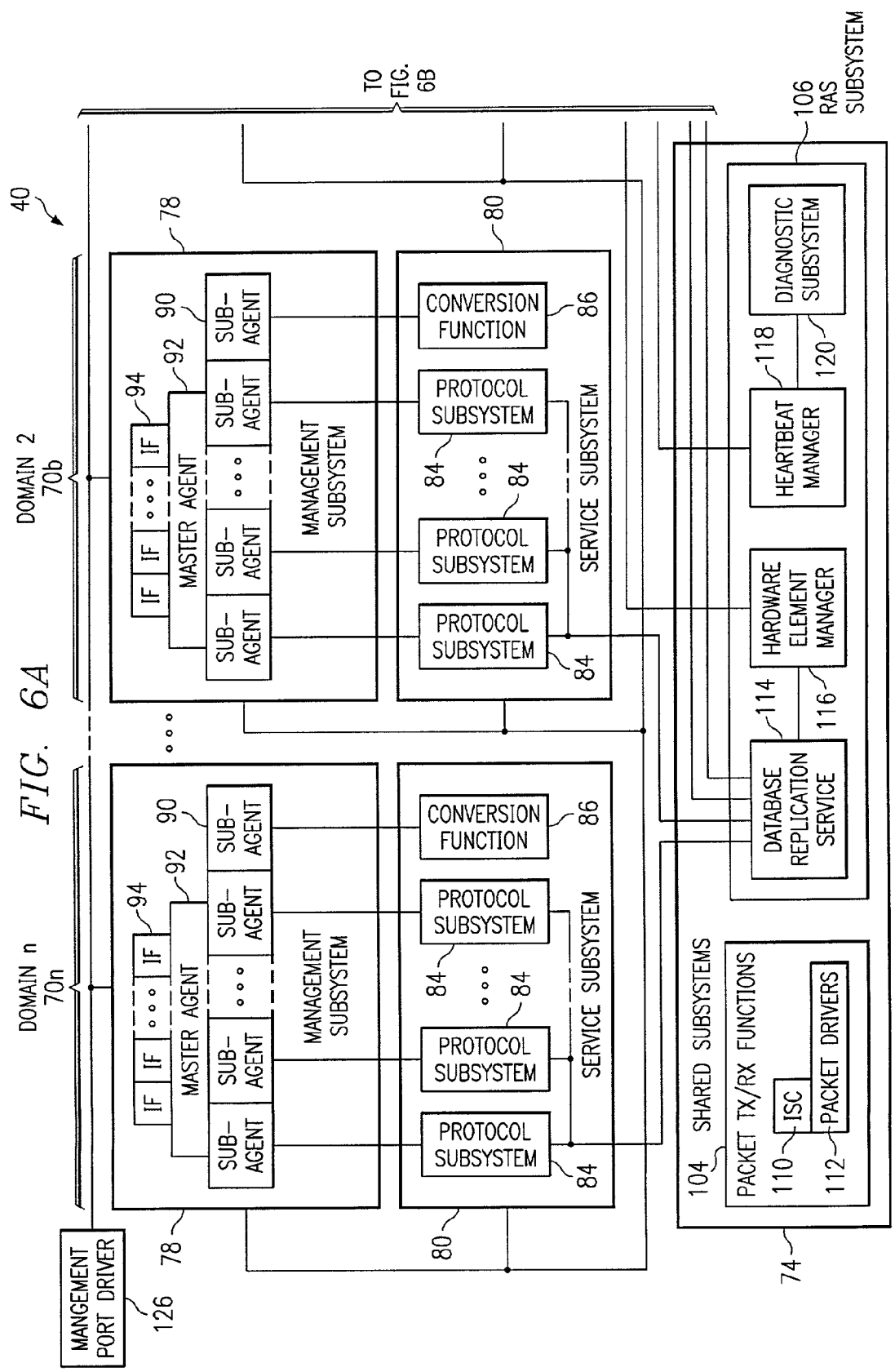

US 7,433,351 B1

ISOLATION OF DATA, CONTROL, AND MANAGEMENT TRAFFIC IN A STORAGE AREA NETWORK

TECHNICAL FIELD OF THE INVENTION

This invention relates generally to the field of storage area networks and more specifically to isolation of data, control, and management traffic in a storage area network.

BACKGROUND OF THE INVENTION

Data stored in a storage area network may need to be isolated from other data stored in the storage area network. Isolating data may become more involved if switches are used to forward data in the storage area network. Typically, separate switches are used to separate data. Using separate switches, however, may increase the complexity of managing the storage area network. Consequently, isolating data in storage area networks has posed challenges.

SUMMARY OF THE INVENTION

In accordance with the present invention, disadvantages and problems associated with previously developed techniques are substantially eliminated or reduced.

According to one embodiment of the present invention, switching data packets includes forwarding first data packets to a first port that is associated with a first domain and operable to receive the first data packets. Second data packets are forwarded to a second port that is associated with a second domain and operable to receive the second data packets. The first data packets are managed using a first management subsystem of a service processor card coupled to the first port and to the second port, and the second data packets are managed using a second management subsystem of the service processor card.

Certain embodiments of the invention may provide technical advantages. A technical advantage of one embodiment is that domains isolate data traffic that passes through a storage area network in a protocol independent fashion such that data traffic from one domain is separated from the data traffic of another domain regardless of the communication protocol. Another technical advantage of one embodiment is that domains isolate control and management functions. The control functions of one domain may be separate from the control functions of another domain. Similarly, management functions of one domain may be separate from the management functions of another domain. Separate management functions may allow for different applications and users to access each domain. Another technical advantage of one embodiment is that a single switch may include multiple domains. The switch may isolate data traffic and control and management functions of different domains, which may provide for more efficient isolation of data in a storage area network. Another technical advantage of one embodiment is that in the presence of protocol translation, the switch may isolate data across different communication protocols while providing a management interface to a user that is consistent independent of the specific communication protocols.

Other technical advantages are readily apparent to one skilled in the art from the following figures, descriptions and claims. Embodiments of the invention may include none, some, or all of the technical advantages.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 7 of the drawings, like numerals being used for like and corresponding parts of the various drawings.

Figure 1:
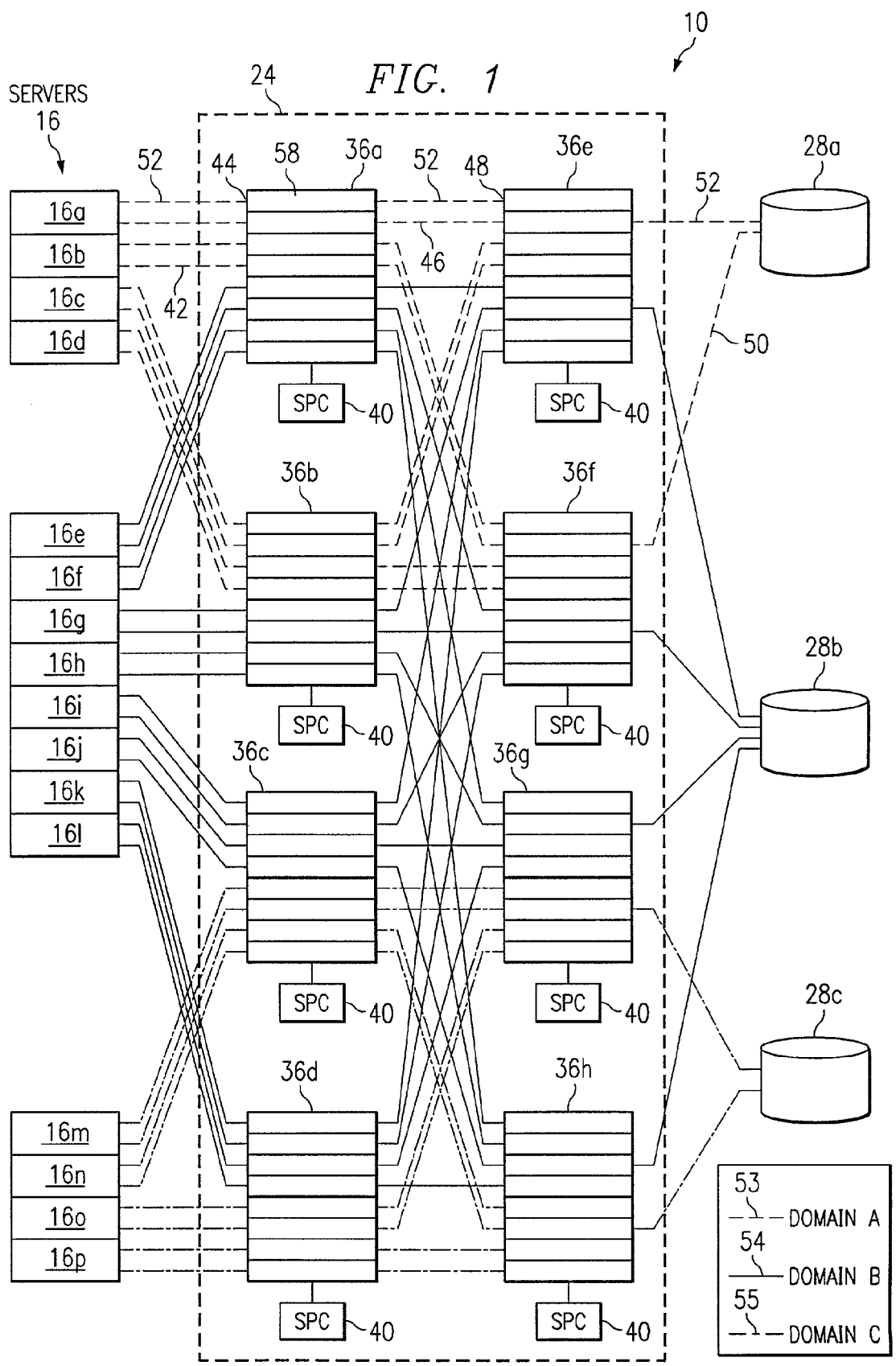
FIG. 1 is a block diagram of a network comprising an example system for switching data packets.

FIG. 1 is a block diagram of a network 10 comprising an example system 24 for switching data packets. Network 10 is partitioned into domains. Domains isolate data traffic that passes through network 10 such that data traffic of one domain is separated from data traffic of another domain. Domains also isolate control and management functions. The control functions of one domain may be separate from the control functions of another domain. Similarly, the management functions of one domain may be separate from the management functions of another domain. Separate management functions may allow for different applications and users to access each domain.

Network 10 includes servers 16, system 24 of switches 36, and databases 28. A server 16 may comprise a computer that operates to receive data to be stored in databases 28, and to distribute data stored in databases 28. As used in this document, the term "computer" refers to any suitable device operable to accept input, process the input according to predefined rules, and produce output, for example, a personal computer, workstation, network computer, wireless data port, wireless telephone, personal digital assistant, one or more processors within these or other devices, or any other suitable processing device. A server 16 may process data packets according to a specific communication protocol.

A set of servers 16 may provide functionality for a domain. For example, servers 16*a-d* service domain A, servers 16*e*-1 service domain B, and servers 16*m-p* service domain C. Although four servers 16*a-d* are illustrated for domain A, eight servers 16*e*-1 are illustrated for domain B, and four servers 16*m-p* are illustrated for domain C, servers 16 may have any suitable configuration. For example, domains may have more or fewer servers 16. According to one embodiment, each server 16 of FIG. 1 represents sixteen servers. As used in this document, "each" refers to each member of a set or each member of a subset of the set.

System 24 includes switches 36, where a switch 36 includes one or more line cards 58 and a service processor card (SPC) 40. Line cards 58, which have ports 44 and 48, perform physical layer packet processing. Service processor card 40 is used to configure the domains. Service processor card 40 may provide separate control functions for different domains, for example, processing of communication protocols to determine an optimal port to which to forward data packets. Service processor card 40 may also provide separate management functions for different domains, which may allow for independent monitoring, maintenance, and reconfiguration of different domains. Switch 36 may comprise any configuration suitable for forwarding data packets. Switch 36 is described in more detail with reference to FIG. 5.

Databases 28 store data associated with different domains. For example, database 28*a* stores data for domain A, database 28*b* stores data for domain B, and database 28*c* stores data for domain C. Databases 28 may comprise any suitable database, for example, an email repository, a customer transaction history database, or an online order processing database. Links 42 couple servers 16 and switches 36*a-d*, links 46 couple switches 36*a-d* and switches 36*e-h*, and links 50 coupled switches 36*e-h* and databases 28.

In operation, data traffic travels between servers 16 and databases 28 along communication paths 52 of network 10. Data traffic travels from server 16 along link 42 to port 44 of line card 58 of switch 36*a-d*. Similarly, data traffic travels from switch 36*a-d* along link 46 to port 48 of line card 58 of switch 36*e-h*. Data traffic travels from switch 36*e-h* along link 50 to database 28. Although three links 42, 46, and 50 and two switches 36 are illustrated, communication path 52 may include any number of links and switches arranged in any suitable configuration. For example, a communication path 52 may include more or fewer switches 36.

A domain may be configured by defining the communication paths 52 of the domain. For example, domain A may be configured by defining communication paths 53, domain B may be configured by defining communication paths 54, and domain C may be configured by defining communication paths 55. In turn, a communication path 52 may be defined by describing portions of the communication path. For example, ports 44 and 48 of communication path 52 may be used to define communication path 52. Accordingly, a domain may be configured by describing the ports 44 and 48 of the communication paths 52 of the domain. Other methods of defining communication paths 52, however, may be used. For example, a packet processor that controls ports 44 and 48 of communication path 52 may be used to define communication path 52. Accordingly, a domain may be configured by describing the packet processors associated with the communication paths 52 of the domain.

Figure 2:
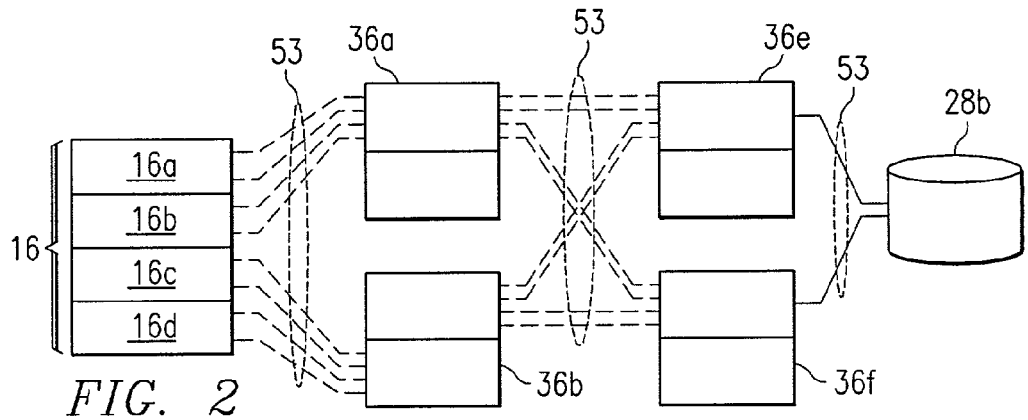
FIG. 2 is a block diagram of domain A of FIG. 1.
Figure 3:
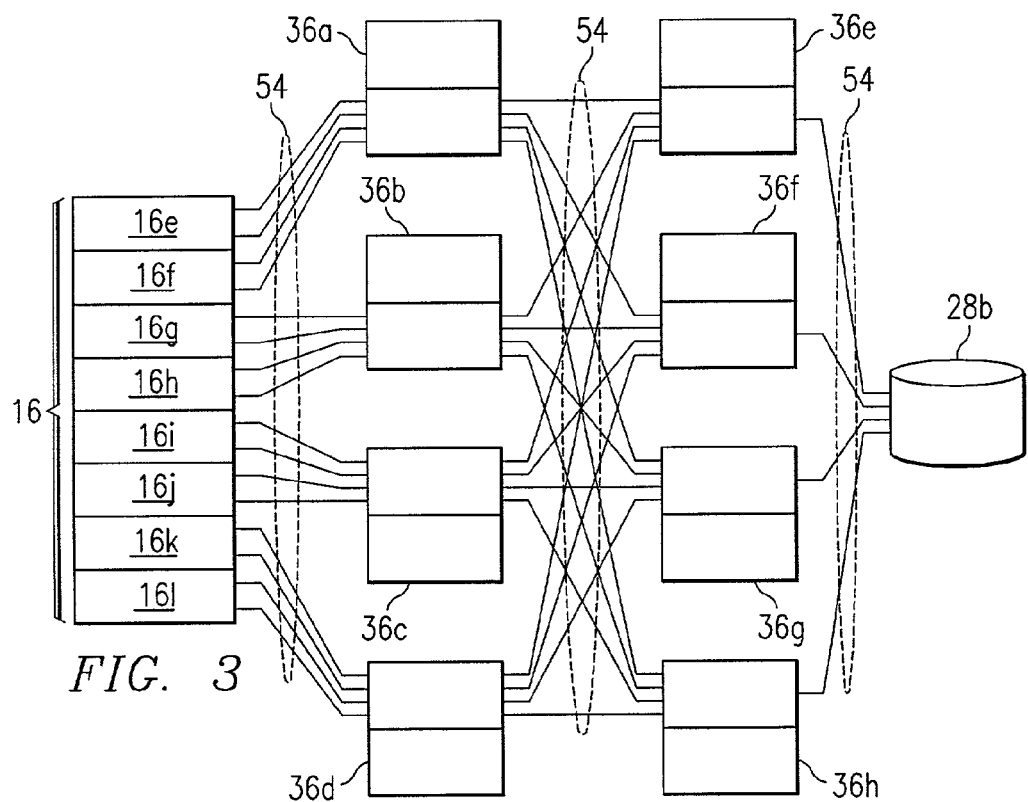
FIG. 3 is a block diagram of domain B of FIG. 1.
Figure 4:
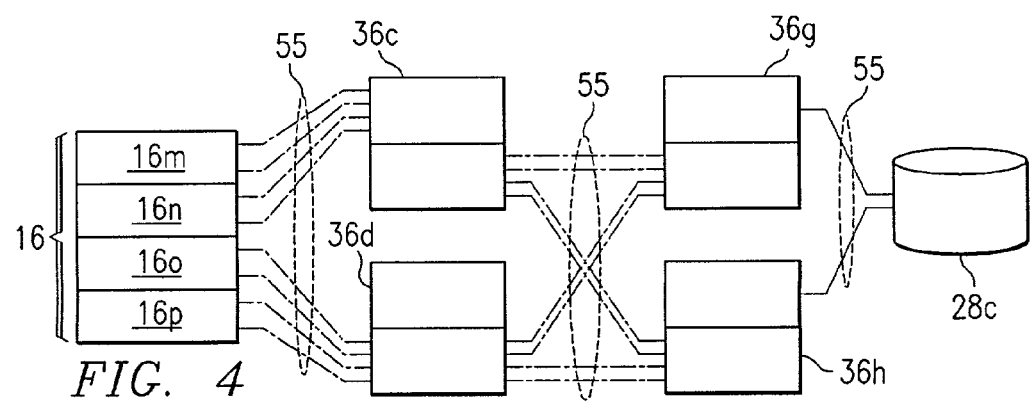
FIG. 4 is a block diagram of domain C of FIG. 1.

Domains A, B, and C are illustrated in FIGS. 2, 3, and 4, respectively.

FIG. 2 is a block diagram of domain A of FIG. 1. Domain A includes communication paths 53, servers 16*a-d*, switches 36*a-b*, e-f, and database 28*a*.

FIG. 3 is a block diagram of domain B of FIG. 1. Domain B includes communication paths 54, servers 16*e-1*, switches 36*a-h*, and database 28*b*.

FIG. 4 is a block diagram of domain C of FIG. 1. Domain C includes communication paths 55, servers 16*m-p*, switches 36*c-d*, g-h, and database 28*c*.

Referring back to FIG. 1, switches 36 may switch data packets for different domains. For example, switch 36*a* switches data packets for domain A and domain B, and switch 36*h* switches data packets for domain B and domain C. Within switches 36, however, data traffic from different domains is isolated. Moreover, control and management functions for data packets from different domains of the switch are separated.

In the illustrated example, network 10 includes servers 16, switches 36, and databases 28. Network 10, however, may include any suitable configuration of servers 16, switches 36, and databases 28. For example, network 10 may include more or fewer servers 16, more or fewer switches 36, or more or fewer databases 28. Additionally, network 10 is shown to include domains A, B, and C having communication paths 52. Network 10, however, may include any suitable number of domains having any suitable configuration of communication paths 52. For example, network 10 may include more or fewer domains, or may include domains with different configurations of communication paths 52.

According to one embodiment, domains may provide for isolation of data stored in databases 28. A user of one domain may be prevented from accessing information from another domain. For example, a customer may be allowed to access enterprise resource planning data stored in one domain, but may not be allowed to access customer relationship management data stored in another domain. According to one embodiment, domains may provide for improved security of a network 10 with multiple administrators. An administrator's ability to control and monitor a network may be confined to a specific domain. The administrator may be allowed to set parameters of the entities in the domain without concern for the impact to other domains, which may isolate the impact of an error to the single domain. The administrator may also be allowed to upgrade control software only within the domain.

Figure 5:
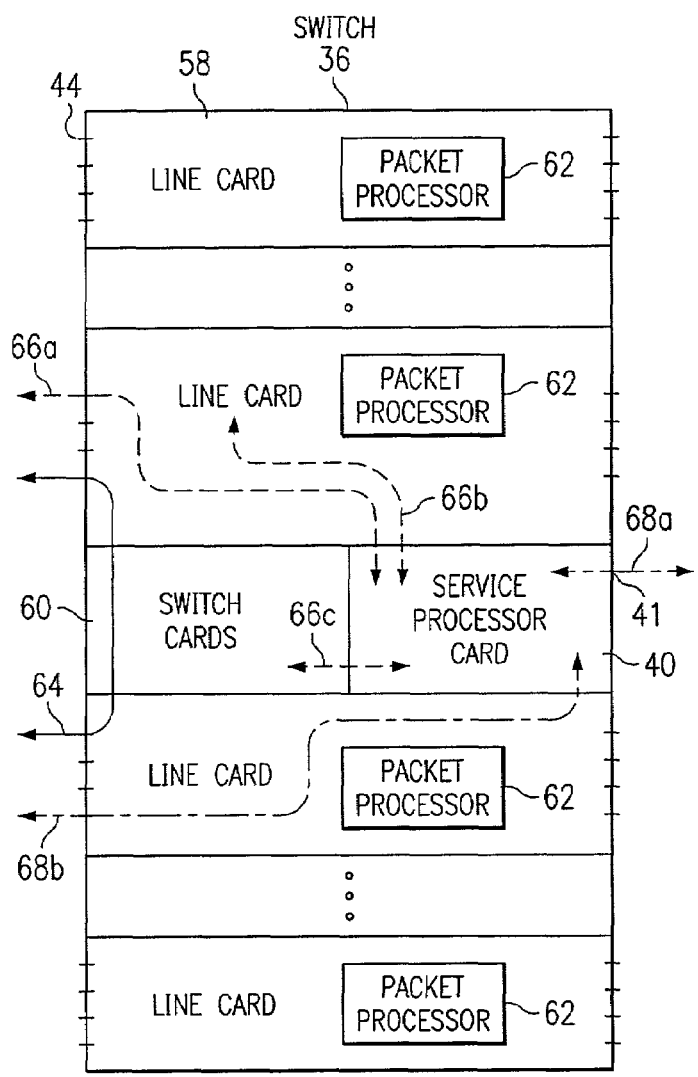
FIG. 5 is a block diagram illustrating a switch of FIG. 1.

FIG. 5 is a block diagram illustrating switch 36 of FIG. 1. Switch 36 includes one or more line cards 58 having ports 44, one or more switch cards 60, and service processor card 40. A line card 58 performs data packet processing, for example, layer one to layer seven data packet processing of the Open System Interconnect (OSI) model, on data packets and forwards the data packets to switch cards 60. For example, line card 58 may perform optical-to-electrical and electrical-to-optical conversions, and may perform serial-differential to parallel-digital and parallel-digital to serial-differential conversions. Line card 58 may be selected to perform data packet processing according to the communication protocol of the data packets.

A packet processor 62 of a line card 58 processes data packets according to the communication protocol associated with the data packets. Packet processor 62 may perform data link switching such as layer two switching of the OSI model and network routing such as layer three routing of the OSI model according to the communication protocol of the data packets. Switch card 60 communicates the data packets to another switch 36 or to a database 28. Service processor card 40 is used to configure domains. Although one service processor card 40 per line card 58 is illustrated, any number of service processor cards 40 may be used. For example, two redundant service processor cards 40 may be used to provide system redundancy. Service processor card 40 is described in more detail with reference to FIG. 6.

A packet processor 62 may be assigned to a domain. Accordingly, a line card 58 may be assigned to as many domains as there are packet processors 62. Similarly, a switch 36 may be assigned to as many domains as the number of packet processors 62 of line cards 58 of switch 36. Any suitable assignment configuration, however, may be used. For example, individual ports 44 of packet processor 62 may be assigned to different domains. Additionally, a port 44 or packet processor 62 may be assigned to multiple domains, resulting in overlapping domains.

In operation, data traffic 64, control traffic 66, and management traffic flow through switch 36. Data traffic 64 comprises user or payload traffic flows. Data packets arrive at port 44 of line card 58, and are sent to another port 44 of the same line card 58 or different line card 58. Control traffic 66 comprises control packets such as control information that determines forwarding of data and internal or external alarms.

Control traffic 66 may be internal or external. Internal control traffic 66 includes messages between the internal components of switch 36, and external control traffic 66 include messages sent between the control entities of different switches. Internal control traffic 66 may occur between port 44 of line card 58 and service processor card 40, between line card 58 and service processor card 40, or between switch card 60 and service processor card 40. External control traffic 66 may comprise, for example, Bridge Protocol Data Units (BPDUs) by Ethernet's Spanning Tree Protocol. Management traffic 68 comprises management packets for network 10. Management traffic 68 may occur between service processor card 40 through a port 41 of service processor card 40 or through port 44 of line card 58.

Figure 6B:
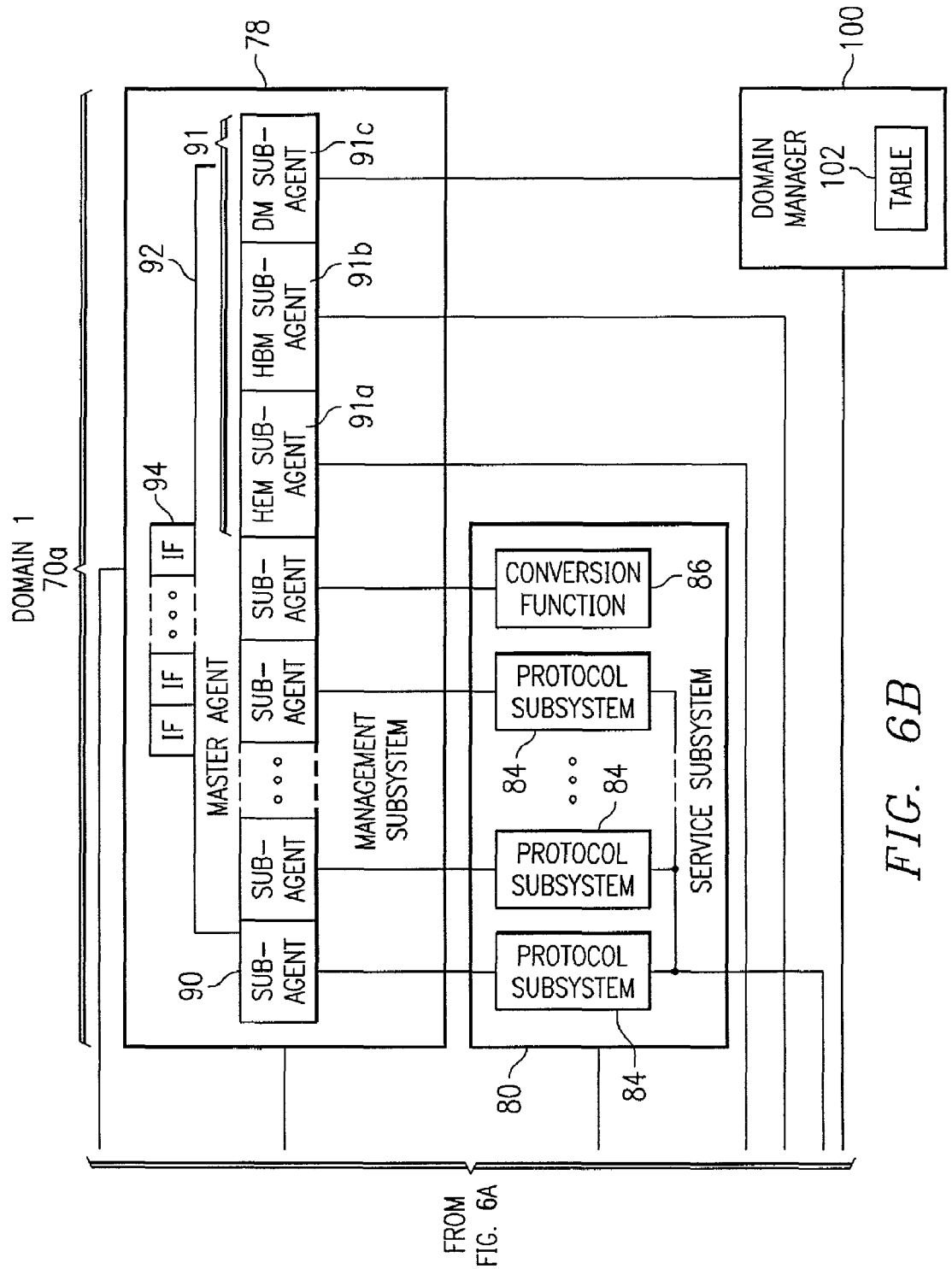
FIG. 6, which includes sub-part FIGS. 6A and 6B, provides respectively, for FIG. 6A, a block diagram illustrating a service processor card of FIG. 5, and for FIG. 6B, a block diagram illustrating a domain of FIG. 6A.

FIG. 6 is a block diagram illustrating service processor card 40 of FIG. 5. Service processor card 40 manages the domains by, for example, configuring the domains, maintaining a table recording the domains, and maintaining access to the domains. Service processor card 40 also manages switch 36 by, for example, monitoring the health and performance of switch 36 and performing system diagnostics on switch 36. Functions that are not performed by line cards 58 or switch cards 60 may be performed by service processor card 40. Service processor card 40 may be implemented in hardware, software, or a combination of hardware and software.

Service processor card 40 includes a subsystem set 70 for each domain 1 through n and shared subsystems 74 that are shared by domains 1 through n. Subsystem set 70 may include a service subsystem 80 and a management subsystem 78. Service subsystem 80 includes one or more protocol subsystems 84 and one or more conversion functions 86. Protocol subsystem 84 includes standards and protocols for a communication protocol. Communication protocols may include, for example, Ethernet, Internet Protocol (IP), Fibre Channel over Internet Protocol (FCIP), InfiniBand (IB), Fibre Connection (FICON), Fibre Channel (FC), or other suitable communication protocol that includes standards for transferring data packets. Each protocol subsystem 84 includes standards and protocols for a different communication protocol. The standards may be used for data packet forwarding such as performing operations to forward data packets.

Conversion function 86 manages conversion of data packets from one communication protocol to another communication protocol. For example, conversion function 86 may convert data packets between small computer system interface (SCSI) protocol and Fibre Channel over Internet Protocol (FCP). Conversion may be performed by a protocol conversion card. A specific conversion function 86 may be assigned to a domain to perform conversion appropriate for the domain.

According to one embodiment, providing a service subsystem 80 that may accommodate any of a number of communication protocols for each domain may allow for flexibility of network 10. Ports of a specific communication protocol may be readily assigned to a specific domain, which may allow for more efficient management of the domains. For example, Ethernet ports may be assigned to a first domain, Fibre Channel ports may be assigned to a second domain, and conversion functions may be assigned to a third domain. An Ethernet expert may manage the first domain, a Fibre Channel expert may manage the second domain, and a conversion expert may manage the third domain.

According to one embodiment, providing separate protocol subsystems 84 for each domain may provide for isolation of software faults. An improperly operating protocol subsystem 84 affects only its associated domain, but not other domains, which may isolate the impact of a fault in protocol subsystem 84.

Management subsystem 78 translates data packets between a specific communication protocol associated with data packets to a generic protocol such as simple network management protocol (SNMP) that may be used to communicate with a user. Management subsystem 78 includes one or more subagents 90, a master agent 92, and one or more interfaces 94. Subagents 90 control protocol subsystems 84. Each subagent 90 is associated with a communication protocol, and controls a protocol subsystem 84 associated with the communication protocol. For example, a subagent 90 that is associated with an Ethernet communication protocol controls the protocol subsystem 84 that is associated with the Ethernet communication protocol.

Master agent 92 controls the operation of subagents 90 and provides for communication external to system 24. Master agent 92 may allow for use of simple network management protocol (SNMP) objects by interfaces 94. According to one embodiment, master agent 92 may include a management information base (MIB) module and a rapid control backplane such as OPENCONTROL BACKPLANE by RAPID LOGIC, INC. The MIB module converts MIB structures and definitions to a device management object model, such that the objects may be used by the rapid control backplane. The rapid control backplane may comprise an embedded software layer that operates a run-time data dictionary between embedded MIBs and interface code. Interfaces 94 may include, for example, an applet interface or a command line interface (CLI).

Subagents 91 may control shared subsystems 74 and a domain manager 100. Subagents 91 convert the commands from the shared subsystems 74 and domain manager 100 into a network protocol such as simple network management protocol (SNMP). A hardware element manager (HEM) subagent 91a controls a hardware element manager 116, a heartbeat manager (HBM) subagent 91b controls a heartbeat manager 118, and a domain manager (DM) subagent 91c controls domain manager 100. In the illustrated example, subagents 91 from domain 1 control shared subsystems 74 and domain manager 100. Subagents 91 from another domain or independent of a domain, however, may be used to control shared subsystems 74 and domain manager 100. A port management driver 126 forwards data packets to management subsystems 78 based upon a destination address of the data packets.

Each domain of network 10 has an independent management infrastructure, which may provide advantages. Providing a separate management subsystem 78 and service subsystem 80 for each domain may allow for more flexible software upgrades. Software upgrades may be applied to the subsystems of individual domains, and do not have to be performed for all the domains of network 10. Accordingly, a domain administrator may schedule a software upgrade without having to coordinate with other domain administrators.

According to one embodiment, a protocol subsystem 84 associated with a Fibre Channel communication protocol may provide for independent management of Fibre Channel services for a specific domain without regard to the other domains. Thus, a domain administrator is not required to coordinate the management of the Fibre Channel services with other domain administrators. According to another embodiment, a protocol subsystem 84 associated with the Ethernet communication protocol may allow for independent management of virtual local area networks (VLAN). Virtual local area network identifiers may be assigned within a domain without coordinating the use of virtual local area network identifiers of other domains.

Domain manager 100 maintains a table 102 that records the configuration of the domains. For example, table 102 may record the packet processors 62 of line card 58 and other entities such as conversion functions 86 assigned to each domain. Table 102 may also keep track of which users may access which domains. In the illustrated example, domain manager 100 is accessed through domain 1 using domain manager (DM) subagent 91c. The other domains may include a domain subagent 91c, which are inactive if domain manager 100 is active through domain one. Domain manager 100, however, may be accessed through any domain or may be accessed independent of any domain.

Shared subsystems 74 include packet transfer and receive functions 104 and reliability, availability, and scalability (RAS) subsystems 106. Packet transfer and receive functions 104 manage data traffic through the domains of network 10. Inter-system communication (ISC) 110 provides for communication of control packets between network 10 and other systems. Communication destined for a domain may be constrained to entities within that domain by including a domain identifier in the destination address of the communication. Inter-system communication 110 also manages communication between each domain and reliability, availability, and scalability subsystem 106. Packet drivers 112 forward data packets to an appropriate domain. The domain may be determined by identifying the source port of the data packet, associating the source port with a packet processor 62, and retrieving the domain from table 102. Packet drivers 112 may allow for the communication protocols to share a common network interface card.

Reliability, availability, and scalability subsystem 104 monitors the health of network 10 and responds to faults in an effort to keep switch 36 operational in the presence of faults. Reliability, availability, and scalability subsystem 104 includes a database replication service 114, a hardware element manager 116, a heartbeat manager 118, and a diagnostic subsystem 120. Database replication service 114 ensures a consistent data set between redundant service processor cards 40 so that a stand-by service processor card 40 may immediately take over for a failed service processor card 40. Hardware element manager 116 manages the hardware of system 24 and may generate a table that describes the entities assigned to each domain. Hardware element manager 116 may retrieve information about the entities such as packet processors 62 and conversion functions 86 from table 102 of domain manager 100.

Heartbeat manager 118 monitors the health of the software components of switch 36. Heartbeats are used to determine the state of health of the software components. Each software component generates periodic heartbeats to the heartbeat manager. If heartbeat manager 118 detects a loss of heartbeats, it may determine that the corresponding software component has failed and may take various recovery steps.

Hardware element manager 116 and heartbeat manager 118 may be managed by hardware element manager (HEM) subagent 91a and heartbeat manager (HBM) subagent 91b, respectively, of domain 1. Although hardware element manager 116 and heartbeat manager 118 are illustrated as managed by domain 1, any other domain or other module may manage hardware element manager 116 and heartbeat manager 118. Diagnostic subsystem 120 monitors the health of the chassis of switch 36.

Figure 7:
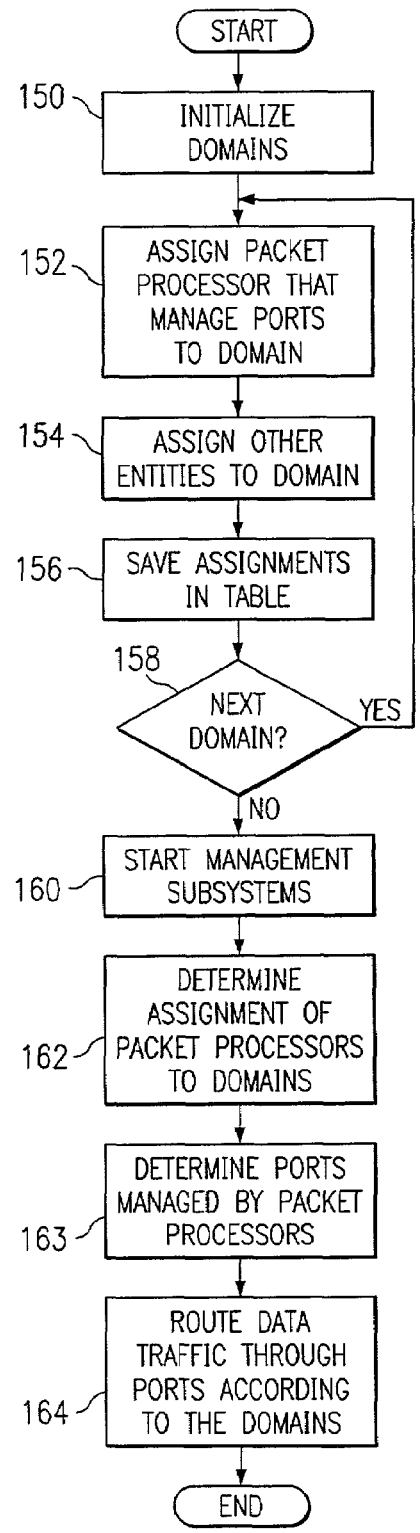
FIG. 7 is a flowchart illustrating an example of a method for configuring domains.

FIG. 7 is a flowchart illustrating an example of a method for configuring domains. The method begins at step 150, where domains are initialized. Domains may be initialized by assigning the entities to a single domain, for example, domain 1. One or more packet processors 62 that manage ports 44 are assigned to a domain in order to include ports 44 in the domain at step 152. Other suitable techniques for associating ports 44 to the domain, however, may be used. For example, a line card 58 that includes ports 44 may be assigned to the domain. Other entities are assigned to the domain at step 154. For example, conversion functions 86 may be assigned to the domain. The assignments are saved in table 102 of domain manager 100 at step 156. Table 102 records the entities belonging to each domain.

If there is a next domain to be configured at step 158, the method returns to step 152, where one or more packet processors 62 are assigned to the next domain. If there is no next domain at step 158, the method proceeds to step 160. Management subsystems 78 are started at step 160. Management subsystems 78 may be started by, for example, rebooting one or more computers associated with system 22. Service processor card 40 of each switch 36 determines the assignment of packet processors 62 to domains at step 162. Service processor card 40 uses table 102 to determine the assigned packet processors 62. Ports 44 managed by the assigned packet processors 62 are determined at step 163 to associate the ports 44 with the appropriate domain. Service processor card 40 forwards the data traffic through ports 44 according to the domains at step 164. Service processor card 40 may program packet processors 62 of each domain such that the traffic from one domain is not forwarded to another domain, effectively isolating the domains. After forwarding the data traffic, the method terminates.

Certain embodiments of the invention may provide technical advantages. A technical advantage of one embodiment is that domains isolate data traffic that passes through a storage area network in a protocol independent fashion such that data traffic from one domain is separated from the data traffic of another domain regardless of the communication protocol. Another technical advantage of one embodiment is that domains isolate control and management functions. The control functions of one domain may be separate from the control functions of another domain. Similarly, management functions of one domain may be separate from the management functions of another domain. Separate management functions may allow for different applications and users to access each domain. Another technical advantage of one embodiment is that a single switch may include multiple domains. The switch may isolate data traffic and control and management functions of different domains, which may provide for more efficient isolation of data in a storage area network. Another technical advantage of one embodiment is that in the presence of protocol translation, the switch may isolate data across different communication protocols while providing a management interface to a user that is consistent independent of the specific communication protocols.

Although an embodiment of the invention and its advantages are described in detail, a person skilled in the art could make various alterations, additions, and omissions without departing from the spirit and scope of the present invention as defined by the appended claims.

What is claimed is:

1. A device for switching data packets, comprising:
   a first port associated with a first domain and operable to receive a plurality of first data packets;
   a second port associated with a second domain and operable to receive a plurality of second data packets;
   a service processor card coupled to the first port and to the second port and operable to:

initiate forwarding of the first data packets to the first port; and
manage the first data packets using a first management subsystem;
initiate forwarding of the second data packets to the second port, the second data packets isolated from the first data packets; and
manage the second data packets using a second management subsystem;
a plurality of first protocol subsystems, each first protocol subsystem coupled to the first management subsystem and operable to process the first data packets according to a communication protocol of a set of communication protocols; and
a plurality of second protocol subsystems, each second protocol subsystem coupled to the second management subsystem and operable to process the second data packets according to a communication protocol of the set of communication protocols.

2. The device of claim 1, wherein the service processor card comprises a domain manager operable to:
associate the first port with the first domain; and
associate the second port with the second domain.

3. The device of claim 1, further comprising:
a first master agent coupled to the first protocol subsystems and operable to translate the first data packets between a communication protocol of the set of communication protocols and a genetic protocol; and
a second master agent coupled to the second protocol subsystems and operable to translate the second data packets between a communication protocol of the set of communication protocols and the generic protocol.

4. A device for switching data packets, comprising:
a first port associated with a first domain and operable to receive a plurality of first data packets;
a second port associated with a second domain and operable to receive a plurality of second data packets;
a service processor card coupled to the first port and to the second port and operable to:
initiate forwarding of the first data packets to the first port; and
manage the first data packets using a first management subsystem;
initiate forwarding of the second data packets to the second port, the second data packets isolated from the first data packets; and
manage the second data packets using a second management subsystem;
a plurality of first protocol subsystems, each first protocol subsystem coupled to the first management subsystem and operable to process the first data packets according to a communication protocol of a set of communication protocols; and
a first master agent coupled to the first protocol subsystems and operable to translate the first data packets between a first communication protocol of the set of communication protocols and a second communication protocol of the set of communication protocols.

5. The device of claim 1, further comprising a shared subsystem coupled to the first management subsystem and the second management subsystem and operable to monitor the device for the first domain and the second domain.

6. The device of claim 1, further comprising:
a first line card comprising the first port and operable to process the first data packets; and
a second line card comprising the second port and operable to process the second data packets.

7. The device of claim 1, further comprising:
a first line card comprising the first port and operable to:
process the first data packets from a first server; and
transmit the first data packets to a first database; and
a second line card comprising the second port and operable to:
process the second data packets from a second server; and
transmit the second data packets to a second database.

8. The device of claim 1, wherein the service processor card is operable to:
receive a software upgrade associated with the first domain; and
implement the software upgrade in the first domain without implementing the software upgrade in the second domain.

9. The device of claim 1, wherein the service processor card is operable to communicate the first data packets between the first port and a management function associated with the first domain without communicating the first data packets to a management function associated with the second domain.

10. A method for switching data packets, comprising:
forwarding a plurality of first data packets to a first port associated with a first domain and operable to receive the first data packets;
forwarding a plurality of second data packets to a second port associated with a second domain and operable to receive the second data packets;
managing the first data packets using a first management subsystem of a service processor card coupled to the first port;
managing the second data packets using a second management subsystem of the service processor card coupled to the second port;
processing the first data packets according to a set of communication protocols using a plurality of first protocol subsystems, each first protocol subsystem operable to process the first data packets according to a communication protocol of the set of communication protocols; and
processing the second data packets according to the set of communication protocols using a plurality of second protocol subsystems, each second protocol subsystem operable to process the second data packets according to a communication protocol of the set of communication protocols.

11. The method of claim 10, further comprising:
saving an assignment of the first port to the first domain in a table; and
saving an assignment of the second port to the second domain in the table.

12. A method for switching data packets, comprising:
forwarding a plurality of first data packets to a first port associated with a first domain and operable to receive the first data packets;
forwarding a plurality of second data packets to a second port associated with a second domain and operable to receive the second data packets;
managing the first data packets using a first management subsystem of a service processor card coupled to the first port;
managing the second data packets using a second management subsystem of the service processor card coupled to the second port;
processing the first data packets according to a set of communication protocols using a plurality of first protocol subsystems, each first protocol subsystem operable to process the first data packets according to a communication protocol of the set of communication protocols;
translating the first data packets between the set of communication protocols and a generic protocol;
processing the second data packets according to the set of communication protocols using a plurality of second protocol subsystems, each second protocol subsystem operable to process the second data packets according to a communication protocol of the set of communication protocols; and
translating the second data packets between the set of communication protocols and the generic protocol.

13. A method for switching data packets, comprising:
forwarding a plurality of first data packets to a first port associated with a first domain and operable to receive the first data packets;
forwarding a plurality of second data packets to a second port associated with a second domain and operable to receive the second data packets;
managing the first data packets using a first management subsystem of a service processor card coupled to the first port;
managing the second data packets using a second management subsystem of the service processor card coupled to the second port;
processing the first data packets according to a set of communication protocols using a plurality of first protocol subsystems, each first protocol subsystem operable to process the first data packets according to a communication protocol of the set of communication protocols; and
translating the first data packets between a first communication protocol of the set of communication protocols and a second communication protocol of the set of communication protocols.

14. The method of claim 10, further comprising monitoring a device comprising the first port and the second port using a shared subsystem.

15. The method of claim 10, further comprising:
processing the first data packets at a first line card comprising the first port; and
processing the second data packets at a second line card comprising the second port.

16. The method of claim 10, further comprising:
receiving the first data packets at the first port from a first server;
transmitting the first data packets to a first database;
receiving the second data packets at the second port from a second server; and
transmitting the second data packets to a second database.

17. The method of claim 10, further comprising:
receiving a software upgrade associated with the first domain; and
implementing the software upgrade in the first domain without implementing the software upgrade in the second domain.

18. The method of claim 10, further comprising communicating the first data packets between the first port and a management function associated with the first domain without communicating the first data packets to a management function associated with the second domain.

19. Logic for switching data packets, the logic embodied in a medium and operable to:
forward a plurality of first data packets to a first port associated with a first domain and operable to receive the first data packets;
forward a plurality of second data packets to a second port associated with a second domain and operable to receive the second data packets;
manage the first data packets using a first management subsystem of a service processor card coupled to the first port;
manage the second data packets using a second management subsystem of the service processor card coupled to the second port;
process the first data packets according to a set of communication protocols using a plurality of first protocol subsystems, each first protocol subsystem operable to process the first data packets according to a communication protocol of the set of communication protocols; and
process the second data packets according to the set of communication protocols using a plurality of second protocol subsystems, each second protocol subsystem operable to process the second data packets according to a communication protocol of the set of communication protocols.

20. The logic of claim 19, wherein the logic is operable to:
save an assignment of the first port to the first domain in a table; and
save an assignment of the second port to the second domain in the table.

21. Logic for switching data packets, the logic embodied in a medium and operable to:
forward a plurality of first data packets to a first port associated with a first domain and operable to receive the first data packets;
forward a plurality of second data packets to a second port associated with a second domain and operable to receive the second data packets;
manage the first data packets using a first management subsystem of a service processor card coupled to the first port;
manage the second data packets using a second management subsystem of the service processor card coupled to the second port;
process the first data packets according to a set of communication protocols using a plurality of first protocol subsystems, each first protocol subsystem operable to process the first data packets according to a communication protocol of the set of communication protocols;
translate the first data packets and the set of communication protocols and a generic protocol;
process the second data packets according to the set of communication protocols using a plurality of second protocol subsystems, each second protocol subsystem operable to process the second data packets according to a communication protocol of the set of communication protocols; and
translate the second data packets and the set of communication protocols and the generic protocol.

22. Logic for switching data packets, the logic embodied in a medium and operable to:
forward a plurality of first data packets to a first port associated with a first domain and operable to receive the first data packets;
forward a plurality of second data packets to a second port associated with a second domain and operable to receive the second data packets;
manage the first data packets using a first management subsystem of a service processor card coupled to the first port; and manage the second data packets using a second management subsystem of the service processor card coupled to the second port;

process the first data packets according to a set of communication protocols using a plurality of first protocol subsystems, each first protocol subsystem operable to process the first data packets according to a communication protocol of the set of communication protocols; and translate the first data packets between a first communication protocol of the set of communication protocols and a second communication protocol of the set of communication protocols.

23. The logic of claim 19, wherein the logic is operable to monitor a device comprising the first port and the second port using a shared subsystem.

24. The logic of claim 19, wherein the logic is operable to:

process the first data packets at a first line card comprising the first port; and process the second data packets at a second line card comprising the second port.

25. The logic of claim 19, wherein the logic is operable to:

receive the first data packets at the first port from a first server;

transmit the first data packets to a first database;

receive the second data packets at the second port from a second server; and transmit the second data packets to a second database.

26. The logic of claim 19, wherein the logic is operable to:

receive a software upgrade associated with the first domain; and implement the software upgrade in the first domain without implementing the software upgrade in the second domain.

27. The logic of claim 19, wherein the logic is operable to communicate the first data packets between the first port and a management function associated with the first domain without communicating the first data packets to a management function associated with the second domain.

28. A device for switching data packets, comprising:

a first port associated with a first domain and operable to receive a plurality of first data packets from a first server and transmit the first data packets to a first database;

a second port associated with a second domain and operable to receive a plurality of second data packets from a second server and transmit the second data packets to a second database;

a service processor card coupled to the first port and to the second port and operable to forward the first data packets to the first port, manage the first data packets using a first management subsystem, forward the second data packets to the second port, the second data packets isolated from the first data packets, manage the second data packets using a second management subsystem;

a domain manager operable to associate the first port with the first domain, and associate the second port with the second domain;

a plurality of first protocol subsystems, each first protocol subsystem coupled to the first management subsystem and operable to process the first data packets according to a communication protocol of a set of communication protocols;

a first master agent coupled to the first protocol subsystems and operable to translate the first data packets from a communication protocol of the set of communication protocols to a generic protocol;

a plurality of second protocol subsystems, each second protocol subsystem coupled to the first management subsystem and operable to process the second data packets according to a communication protocol of the set of communication protocols;

a second master agent coupled to the second protocol subsystems and operable to translate the second data packets from a communication protocol of the set of communication protocols to the generic protocol; and a shared subsystem coupled to the first management subsystem and the second management subsystem and operable to monitor the device for the first domain and the second domain.

* * * * *